United States Patent
Ta et al.

(10) Patent No.: US 12,198,556 B2
(45) Date of Patent: Jan. 14, 2025

(54) FLIGHT FORMATION ASSISTANCE SYSTEM FOR AIRCRAFT

(71) Applicant: Airbus SAS, Blagnac (FR)

(72) Inventors: Guillaume Ta, Blagnac (FR); Clément Frot, Blagnac (FR); Jonathan Beck, Blagnac (FR)

(73) Assignee: Airbus SAS, Blagnac (FR)

( * ) Notice: Subject to any disclaimer, the term of this patent is extended or adjusted under 35 U.S.C. 154(b) by 191 days.

(21) Appl. No.: 17/963,236

(22) Filed: Oct. 11, 2022

(65) Prior Publication Data

US 2023/0222921 A1    Jul. 13, 2023

(51) Int. Cl.
*G08G 5/00*   (2006.01)
*G05D 1/00*   (2006.01)

(52) U.S. Cl.
CPC .......... *G08G 5/0008* (2013.01); *G05D 1/104* (2013.01); *Y02T 50/00* (2013.01)

(58) Field of Classification Search
None
See application file for complete search history.

(56) References Cited

U.S. PATENT DOCUMENTS

| | | |
|---|---|---|
| 2003/0222795 A1 | 12/2003 | Holforty et al. |
| 2014/0214243 A1* | 7/2014 | Whitehead ........... G05D 1/0202 701/3 |
| 2017/0293307 A1* | 10/2017 | Frolov .................... B64C 13/16 |
| 2019/0310642 A1 | 10/2019 | Robin et al. |
| 2023/0359225 A1* | 11/2023 | Frot ..................... G08G 5/0091 |

FOREIGN PATENT DOCUMENTS

| | | |
|---|---|---|
| FR | 3041121 A1 | 3/2017 |
| FR | 3049076 A1 | 9/2017 |
| FR | 3079942 A1 | 10/2019 |

OTHER PUBLICATIONS

E. F. Trollip and J. A. A. Engelbrecht, "Ride comfort in commercial aircraft during formation flight using conventional flight control," 2016 IEEE Aerospace Conference, Big Sky, MT, USA, 2016, pp. 1-20, doi: 10.1109/AERO.2016.7500886. (Year: 2016).*
French Search Report dated May 13, 2022; priority document.

* cited by examiner

*Primary Examiner* — Peter D Nolan
*Assistant Examiner* — Michael F Whalen
(74) *Attorney, Agent, or Firm* — Greer, Burns & Crain, Ltd.

(57) ABSTRACT

A formation flight assistance system is placed on board a follower aircraft to benefit from an upwards air flow induced by a wake vortex generated by a leader aircraft. The system determines a wake vortex effect experienced by the follower aircraft as being a difference between measurements taken by sensors and modelling in a wake vortex free environment. Using a recursive Bayesian filter, the system determines an estimated position of the wake vortex on the basis of information relating to the leader aircraft and a wake vortex model, and determines an estimation uncertainty, according to which a potential discomfort window is computed for the passengers of the follower aircraft. The system keeps the follower aircraft outside the potential discomfort window. Thus, the comfort of the passengers of the follower aircraft is provided, while benefiting from an upwards air flow induced by the wake vortex.

8 Claims, 6 Drawing Sheets

FLIGHT FORMATION ASSISTANCE SYSTEM FOR AIRCRAFT

CROSS-REFERENCES TO RELATED APPLICATIONS

This application claims the benefit of the French patent application No. 2110835 filed on Oct. 13, 2021, the entire disclosures of which are incorporated herein by way of reference.

FIELD OF THE INVENTION

The present invention relates to a flight formation assistance system for aircraft. More specifically, the present invention relates to a system for assisting the positioning of a follower aircraft relative to a wake vortex (also called marginal vortex) of a leader aircraft during a formation flight.

BACKGROUND OF THE INVENTION

Wake vortices, also called marginal vortices or wingtip vortices, are counter-rotating wake turbulence at the wingtips of an aircraft in flight caused by a pressure difference between the pressure face and the suction face of the wings. Wake vortices can remain for several minutes following the passage of an aircraft, and can disrupt the comfort of the passengers on another aircraft passing in the vicinity in the meantime. Safety distances between aircraft in flight are applied by Air Traffic Control (ATC) in order to take into account wake vortices and to avoid potential flight issues related to their existence.

In formation, a leader aircraft is followed by one or more follower aircraft, which can experience discomfort associated with the wake vortices of the leader aircraft. However, by controlling their position relative to the wake vortices, the follower aircraft can benefit from an upwards air flow phenomenon induced by the wake vortices, thereby reducing drag and fuel consumption. However, if the follower aircraft enter the space between the wake vortices of the leader aircraft, the follower aircraft experience a downward air flow phenomenon that is induced by the wake vortices and that impairs their performance. Similarly, turbulence is experienced by a follower aircraft if one of its wings enters a wake vortex. This turbulence causes significant discomfort to the passengers of the follower aircraft.

Solutions exist to allow a follower aircraft to automatically position itself relative to a wake vortex generated by a leader aircraft. French patent application FR 3041121 A1 can be referred to, for example. Although the solution disclosed therein allows a follower aircraft to effectively benefit from the upwards air flow phenomenon induced by a wake vortex of a leader aircraft, the aforementioned discomfort can be experienced by the passengers of the follower aircraft.

It is then beneficial for a formation flight assistance solution to be provided that alleviates the aforementioned discomfort, while benefiting from the upwards air flow phenomenon induced by the wake vortex of the leader aircraft.

SUMMARY OF THE INVENTION

A method for assisting the formation flight of aircraft is proposed, the method being implemented by a system in the form of on-board electronic circuitry in an aircraft acting as a follower aircraft, the method comprising the following steps:
obtaining information relating to a leader aircraft generating a wake vortex inducing an upwards air flow, the system of which aims to benefit the follower aircraft;
determining a wake vortex effect experienced by the follower aircraft as a difference between measurements, taken by sensors of the follower aircraft, and modelling of the follower aircraft in a wake vortex free environment;
determining, using a recursive Bayesian filter, an estimated position of the wake vortex on the basis of the information obtained relative to the leader aircraft and a wake vortex model, and determining an estimation uncertainty on the estimated position of the wake vortex by comparing the effect of the wake vortex experienced by the follower aircraft and a theoretical effect of the wake vortex on the follower aircraft according to the wake vortex model;
determining a potential discomfort window around the estimated position of the wake vortex, as a function of the estimation uncertainty of the estimated position of the wake vortex; and
defining and applying an approach trajectory to the wake vortex and keeping the follower aircraft outside the potential discomfort window, by controlling a placement of the follower aircraft at a predefined distance from the estimated position of the wake vortex when the dimensions of the potential discomfort window are such that this is allowed, and at a predefined margin from the potential discomfort window otherwise.

In this way, the follower aircraft benefits from the upwards air flow phenomenon induced by the wake vortex of the leader aircraft, without generating discomfort for the passengers of the follower aircraft.

In a particular embodiment, the recursive Bayesian filter is a particle filter.

In a particular embodiment, the estimated position of the wake vortex and the potential discomfort window are determined as follows:
determining, for each potential position from among a set of potential positions determined on the basis of the determined geometric position of the wake vortex, a probability value for the presence of the wake vortex at the potential position, with the relevant probability value being determined by comparing the effect of the wake vortex experienced by the follower aircraft and a theoretical effect of the wake vortex on the follower aircraft according to the wake vortex model when the wake vortex is located at the potential position;
forming the potential discomfort window by grouping together potential positions of the wake vortex with a probability value above a first predetermined threshold.

In a particular embodiment, when the system detects that the dimensions of the potential discomfort window allow the follower aircraft to be placed at the predefined distance from the estimated position of the wake vortex, the system commands the follower aircraft to perform load factor movements below a second predetermined threshold.

In a particular embodiment, the relevant movements are preferably vertical oscillatory or pseudo-oscillatory movements.

A computer program product is also proposed comprising instructions causing the method as set forth above to be implemented in any of its embodiments, when the instructions are executed by a processor. An information storage medium is also proposed, on which such a computer program product is stored, thereby causing the method to be implemented, when the instructions are read from the information storage medium and are executed by a processor.

A system for assisting the formation flight of aircraft is also proposed, in the form of on-board electronic circuitry in an aircraft intended to act as a follower aircraft in the formation flight, the electronic circuitry being configured to implement the following steps of:

- obtaining information relating to a leader aircraft generating a wake vortex inducing an upwards air flow, the system of which aims to benefit the follower aircraft;
- determining a wake vortex effect experienced by the follower aircraft as a difference between measurements, taken by sensors of the follower aircraft, and modelling of the follower aircraft in a wake vortex free environment;
- determining, using a recursive Bayesian filter, an estimated position of the wake vortex on the basis of the information obtained relative to the leader aircraft and a wake vortex model, and determining an estimation uncertainty on the estimated position of the wake vortex by comparing the effect of the wake vortex experienced by the follower aircraft and a theoretical effect of the wake vortex on the follower aircraft according to the wake vortex model;
- determining a potential discomfort window around the estimated position of the wake vortex, as a function of the estimation uncertainty of the estimated position of the wake vortex; and
- defining and applying an approach trajectory to the wake vortex and keeping the follower aircraft outside the potential discomfort window, by controlling a placement of the follower aircraft at a predefined distance from the estimated position of the wake vortex when the dimensions of the potential discomfort window are such that this is allowed, and at a predefined margin from the potential discomfort window otherwise.

An aircraft is also proposed acting as a follower aircraft in a formation flight, which aircraft comprises a formation flight assistance system as set forth above.

BRIEF DESCRIPTION OF THE DRAWINGS

The aforementioned and other features of the invention will become more clearly apparent from the following description of at least one embodiment, with the description being provided with reference to the accompanying drawings, in which.

DETAILED DESCRIPTION OF THE PREFERRED EMBODIMENTS

Figure 1:
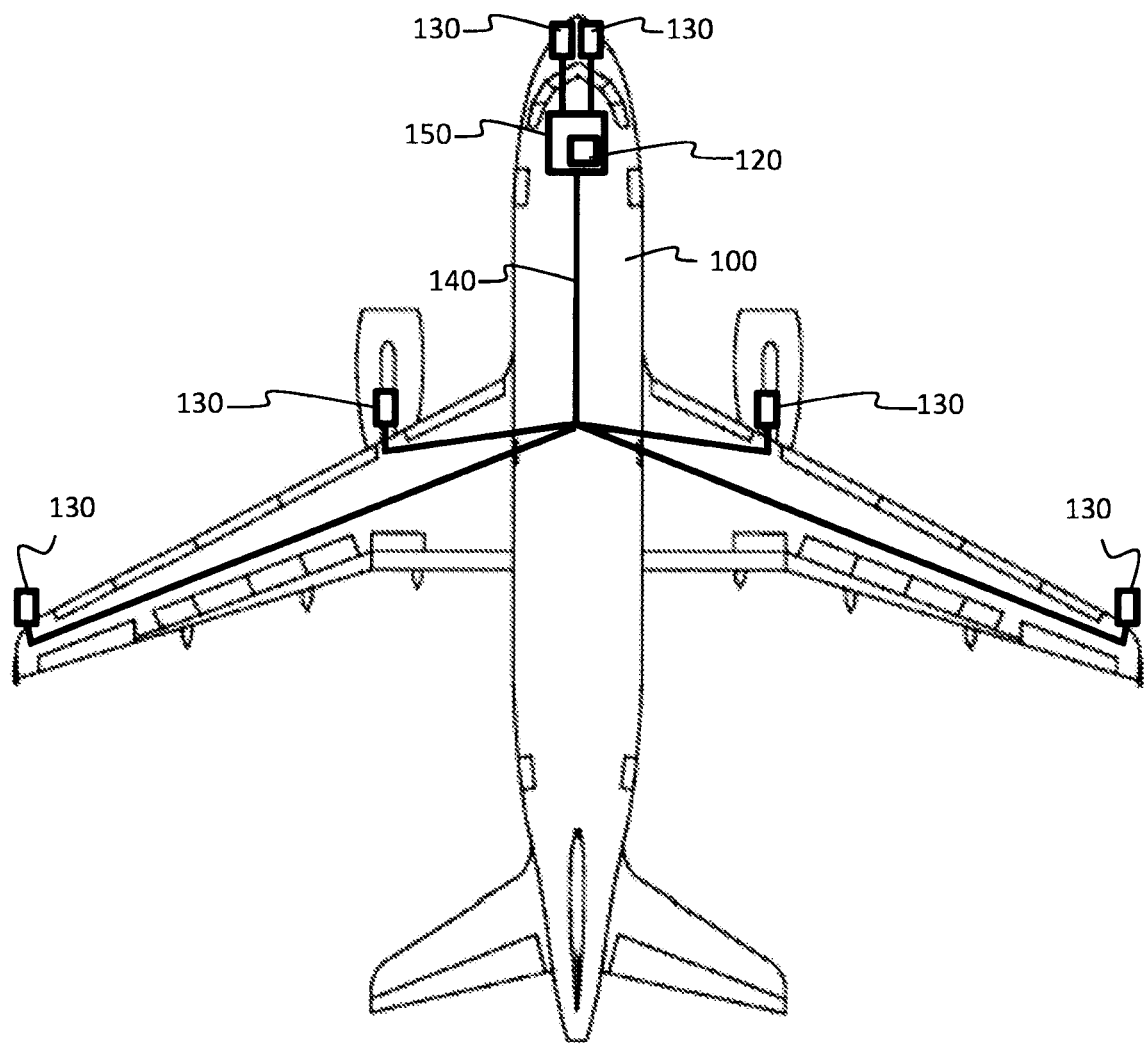
FIG. 1 schematically illustrates, as a top view, an aircraft equipped with a formation flight assistance system.

FIG. 1 schematically illustrates, as a top view, an aircraft 100 equipped with a formation flight assistance system 120, more specifically when the aircraft 100 acts as a follower in a formation flight, in order to benefit from an upwards air flow phenomenon induced by a wake vortex of a leader aircraft.

In a particular embodiment, the system 120 is integrated in the avionics 150 of the aircraft 100.

The aircraft 100 is equipped with numerous sensors 130, as is normally the case in aeronautics: temperature sensors, vibration sensors (for example, in the form of accelerometers), pressure sensors, inertial sensors, etc. These sensors 130 provide information, supplemented by radiofrequency-communicated information (for example, air-ground or satellite communications), allowing the avionics 150 to determine parameters relating to the aircraft 100 in flight (speed, attitude, altitude, etc.) and to its environment (atmospheric pressure, air speed, etc.). Each sensor 130 is connected to the avionics 150 by electrical wiring, or a communication system (communication bus, communication network, etc.) 140, as shown in a purely illustrative manner in FIG. 1.

As disclosed hereafter, the system 120 relies on information provided by the avionics 150, in particular by way of the sensors 130, as well as on information provided by the leader aircraft and from pre-established models, in order to help position the aircraft 100, acting as a follower aircraft, so as to benefit from the upwards air flow phenomenon without causing any discomfort to the passengers of the aircraft 100.

Preferably, the system 120 can be disengaged and is activated during formation flight phases where the aircraft 100 is a follower. For example, the system 120 is activated/deactivated on the command of a pilot of the aircraft 100.

Figure 2:
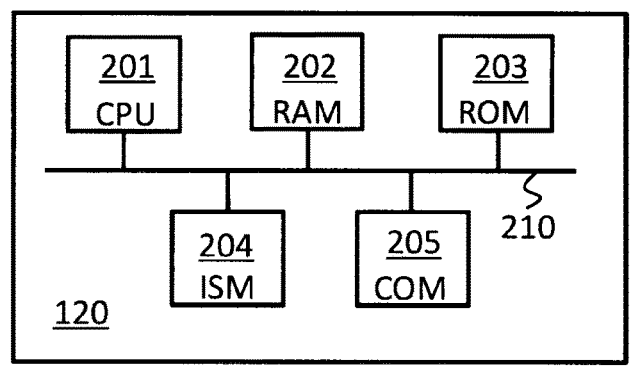
FIG. 2 schematically illustrates an example of a hardware architecture on which the formation flight assistance system can be based.

FIG. 2 schematically illustrates an example of a hardware architecture on which the system 120 may be based.

The system 120 then comprises, connected by a communication bus 210: a processor or CPU ("Central Processing Unit") 201; a RAM ("Random Access Memory") 202; a ROM ("Read Only Memory") 203, for example, a Flash memory; a data storage device, such as an HDD ("Hard Disk Drive"), or an ISM ("Information Storage Medium") reader 204, such as an SD ("Secure Digital") card reader; at least one communication interface 205 allowing the system 120 to more specifically interact with the avionics 150, as well as with the avionics of the leader aircraft or with ground equipment acting as a relay with the avionics of the leader aircraft.

The processor 201 is capable of executing instructions loaded into the RAM 202 from the ROM 203, an external memory (not shown), a storage medium, such as an SD card, or a communication network (not shown). When the system 120 is powered on, the processor 201 is able to read instructions from the RAM 202 and to execute them. These instructions form a computer program causing the processor 201 to implement the modular architecture, behaviors, steps and algorithms described herein.

All or part of the modular architecture, behaviors, steps and algorithms described herein thus can be implemented in software form by executing a set of instructions using a programmable machine, such as a DSP (Digital Signal Processor) or a microprocessor, or can be implemented in hardware form using a dedicated machine or component (a "chip") or set of components (a "chipset), such as a Field-Programmable Gate Array (FPGA) or Application-Specific Integrated Circuit (ASIC). The system 120 therefore comprises electronic circuitry arranged and configured to implement the modular architecture and the behaviors, steps and algorithms described herein.

Figure 3:
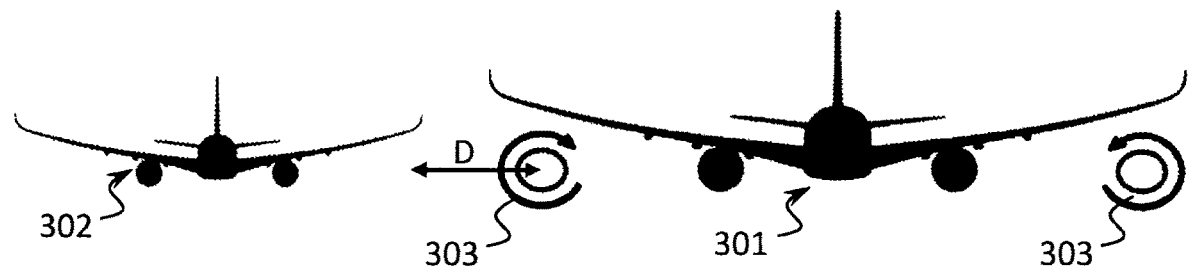
FIG. 3 schematically illustrates, as a front view, the positioning of a follower aircraft relative to a leader aircraft during a formation flight.

FIG. 3 schematically illustrates, as a front view, the positioning of a follower aircraft 302 relative to a leader aircraft 301 during a formation flight. The aircraft 301 and 302 are in cruise flight. The movement of the leader aircraft 301 generates wake vortices 303. If the follower aircraft 302 maintains a distance D ranging between a minimum threshold Dmin (for example, Dmin=20 meters) and a maximum threshold Dmax (for example, Dmax=30 meters) from the marginal vortices outside the trajectory of the leader aircraft 301, the follower aircraft 302 benefits from the aforementioned upwards air flow phenomenon, thereby reducing drag and fuel consumption for the follower aircraft 302. Between the minimum threshold Dmin and the maximum threshold Dmax, placing the follower aircraft 302 at a distance Dconf (for example, Dconf=25 meters, plus or minus a predefined margin) allows significant benefit to be drawn from the upwards air flow phenomenon, while ensuring the comfort of the passengers of the follower aircraft 302.

Figure 4:
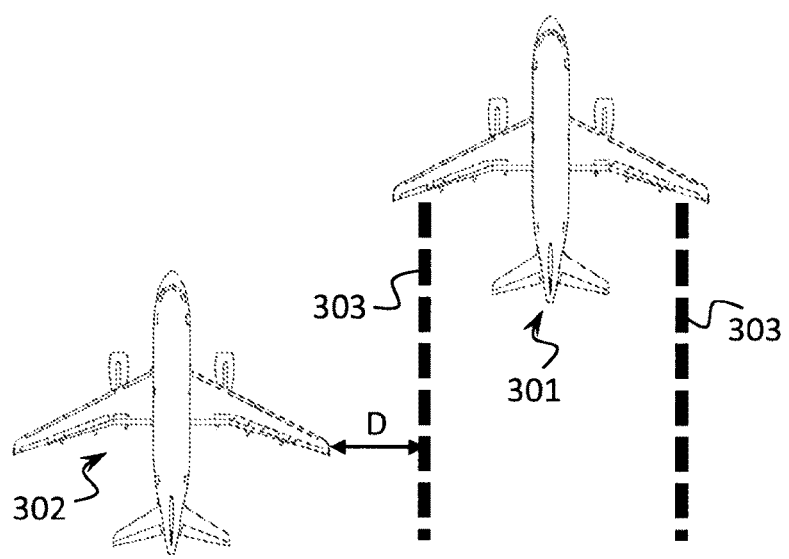
FIG. 4 schematically illustrates, as a top view, the positioning of a follower aircraft relative to the leader aircraft during formation flight.

In addition to FIG. 3, FIG. 4 schematically illustrates the positioning of the follower aircraft 302 relative to the leader aircraft 301 as a top view.

The wake vortices 303 are schematically shown in a simplified manner Indeed, from the wings, the wake vortices 303 firstly tend to move towards each other and then to keep a substantially constant distance between each other, while losing altitude relative to that at which they are generated. In addition, the wind affects the trajectory and the geometry of the wake vortices 303 over time.

Figure 5:
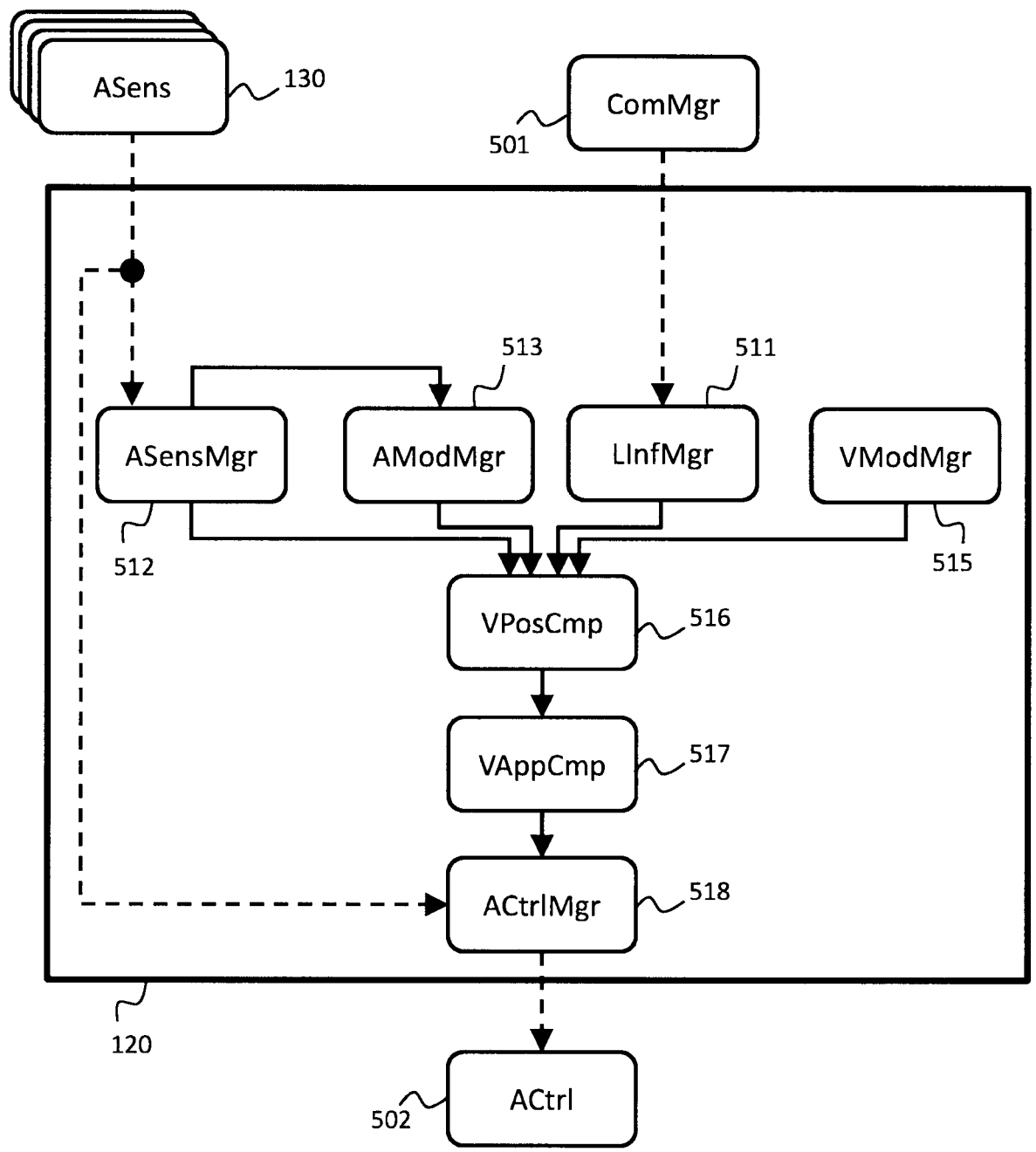
FIG. 5 schematically illustrates a modular architecture of the formation flight assistance system.

FIG. 5 schematically illustrates a modular architecture of the system 120.

The system 120 comprises a sensor management module, ASensMgr 512, configured to gather information in real-time that relates to the measurements taken by the sensors 130 (denoted ASens in FIG. 5), including information relating to current atmospheric conditions (for example, wind speed and direction), as well as information relating to effects experienced by the follower aircraft 302 (for example, roll acceleration).

The system 120 also comprises a module for managing information relating to the leader aircraft 301 (wingspan, mass, geographical position, speed, altitude, attitude, etc.) called module LInfMgr 511. The module LInfMgr 511 receives this information, and any updates thereof, in real-time from a communications management system, ComMgr 501, of the avionics 150 communicating with an on-board system of the leader aircraft 301, optionally via an intermediate relay (for example, ground communication system).

The system 120 further comprises an aircraft model management module, AModMgr 513, configured to determine any effects on the follower aircraft 302 of the wake vortex 303. The aircraft model management module, AModMgr 513, uses measurements provided by the sensors ASens 130 (for example, roll acceleration) in order to determine any effects experienced by the follower aircraft 302. The module AModMgr 513 also uses a model of the follower aircraft 302, modelling effects experienced by the follower aircraft 302 in flight outside the wake of another aircraft (for example, aerodynamic properties as a function of the mass of the aircraft). For example, for a certain aileron deflection, a certain roll acceleration is expected in an environment free of wake vortices generated by another aircraft. Thus, the module AModMgr 513 is configured to determine the effects on the follower aircraft 302 of the wake vortex 303 by subtracting the effects contained in the model of the follower aircraft 302 from those measured by the sensors ASens 130.

The system 120 further comprises a wake vortex position computation module, VPosCmp 516. The module VPosCmp 516 is configured to estimate a position of the wake vortex 303 with an estimation uncertainty, which itself can be determined, and is configured to determine a spatial window, called potential discomfort window, defined by the estimation uncertainty around the estimated position of the wake vortex 303. In a particular embodiment, the potential discomfort window defines a space in which the wake vortex 303 is assumed to be present with a probability that is greater than or equal to a predetermined threshold TH_vx.

The module VPosCmp 516 computes a georeferenced geometry of the wake vortex 303 to this end.

The module VPosCmp 516 is also configured to compute the georeferenced geometry of the wake vortex 303 by which the follower aircraft 302 can benefit from the upwards air flow phenomenon, on the basis of information relating to the leader aircraft 301 (such as the wingspan, the mass, the geographical position, the speed, the altitude, the attitude, etc.) and information relating to the atmospheric conditions (for example, wind speed and direction) encountered by the leader aircraft 301 and the follower aircraft 302. The computation of the georeferenced geometry of the wake vortex 303 is well known to a person skilled in the art and involves several steps: constructing successive georeferenced positions through which the leader aircraft 301 has passed, computing wind-related drift, and taking into account the physics of the wake vortex with a descent speed, in particular. The module VPosCmp 516 thus carries out real-time georeferenced three-dimensional modelling of the geometry of the wake vortex 303. Then, by projecting the position of the follower aircraft 302 onto computed positions of the center of the wake vortex, a distance can be computed for the follower aircraft 302 relative to the wake vortex. Details relating to implementation and computation are disclosed, for example, in the aforementioned French patent application FR 3041121 A1.

In order to determine the georeferenced geometry of the wake vortex 303, the module VPosCmp 516 uses data (descent speed, etc.) provided by a wake vortex model. The system 120 then comprises a wake vortex model management module, VModMgr 515, providing the module VPosCmp 516 with the wake vortex model data.

The module VPosCmp 516 is thus configured in order to determine, using a recursive Bayesian filter, an estimated position of the wake vortex on the basis of the obtained leader aircraft information and a wake vortex model, and in order to determine an estimation uncertainty of the estimated position of the wake vortex by comparing the effect of the wake vortex 303 experienced by the follower aircraft 302 and a theoretical effect of the wake vortex 303 on the follower aircraft 302 according to the wake vortex model. Indeed, particularly due to measurement inaccuracies and/or inaccuracies in the models that are used, uncertainty exists regarding the actual geometry and georeferencing of the wake vortex 303 computed by the module VPosCmp 516 by way of the recursive Bayesian filter.

The module VPosCmp 516 is thus configured in order to determine the potential discomfort window associated with the estimated position of the wake vortex, as a function of the estimation uncertainty of the estimated position of the wake vortex. In one embodiment, the module VPosCmp 516 determines the potential discomfort window by applying a distance dependent on the estimation uncertainty (for example, proportional to the estimation uncertainty or linearly dependent on the estimation uncertainty), around the estimated position of the wake vortex 303. Thus, the larger the estimation uncertainty, the larger the dimensions of the potential discomfort window. The accuracy of the estimation then can be improved by gaining observability, in order to allow the dimensions of the potential discomfort window to be reduced.

In another embodiment, by way of a particle filter, the module VPosCmp 516 determines the theoretical effect of the wake vortex 303 on the follower aircraft 302 at different potential positions of the wake vortex 303 in light of the previously computed georeferenced geometry, and compares, for each position from among the different potential positions, this theoretical effect with the effect on the aircraft 302 of the wake vortex 303 as determined by the module AModMgr 513 (for example, by way of pitching moment data). The module VPosCmp 516 then determines a probability value for the presence of the wake vortex 303 at the position. Thus, if the theoretical effect is too small compared to the effect actually experienced by the follower aircraft 302 according to the measurements of the sensors ASens 130, i.e., the probability value is below the predetermined threshold TH_vx, the wake vortex 303 is unlikely to be at this position. The spatial window in which the wake vortex 303 is assumed to be present with a probability that is greater than or equal to the predetermined threshold TH_vx is a space of potential discomfort for the passengers of the follower aircraft 302, due to turbulence that is potentially experienced by the follower aircraft 302 and is caused by the wake vortex 303. This spatial window then constitutes the aforementioned potential discomfort window.

In a particular embodiment, the module VPosCmp 516 determines a probability value of the presence of the wake vortex 303 at each of the positions for different wake vortex characteristics (vortex diameter, velocity profiles, circulation profiles, etc.).

As an alternative embodiment of the particle filter described above, the module VPosCmp 516 can include another type of recursive Bayesian filter, such as a Kalman filter. Other approaches for estimating the position of the wake vortex 303 and the associated estimation uncertainty, such as a computation of local gradients, can be derived from the general knowledge of a person skilled in the art.

Figure 8:
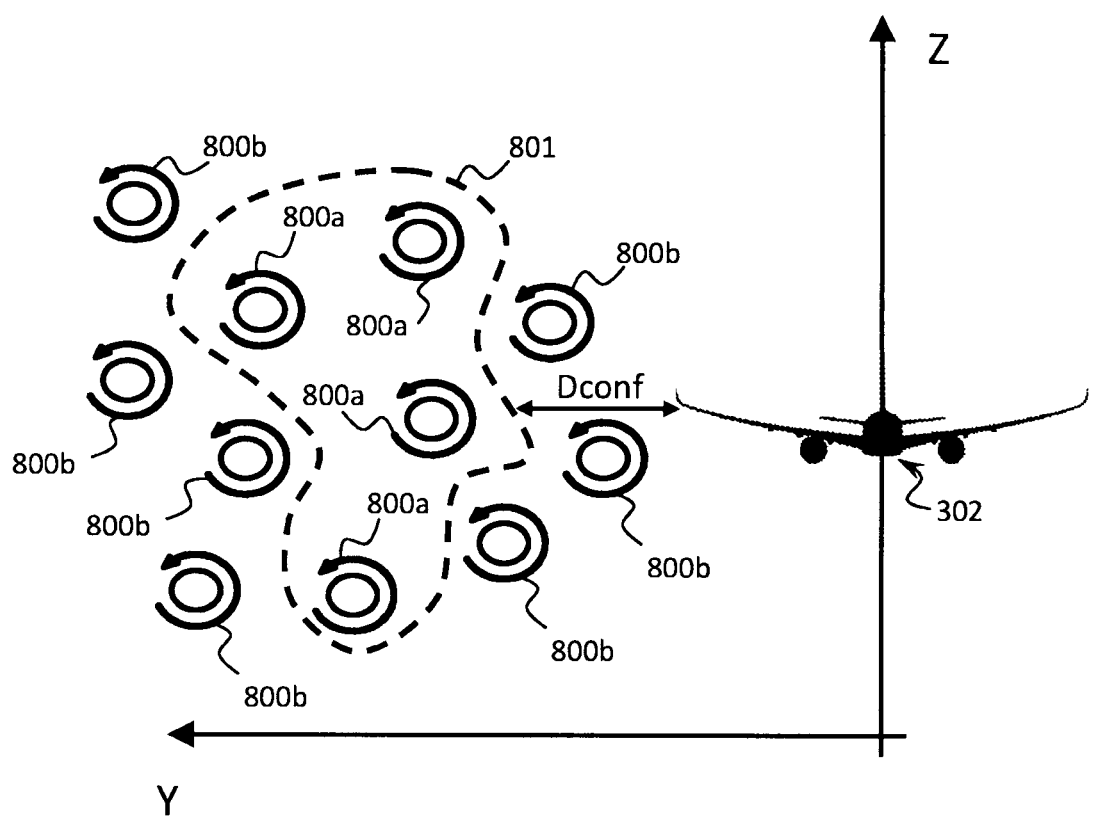
FIG. 8 schematically illustrates an example of a potential discomfort window determined for the follower aircraft, in a particular embodiment.

The module VPosCmp 516 carries out distance computations relative to the wake vortex 303 in a two-dimensional space, in a [Y, Z] plane in an [X, Y, Z] geodetic coordinate system, as shown in FIG. 8. The three-dimensional space [X, Y, Z] in which the georeferenced geometry of the wake vortex 303 is computed allows trajectory tracking to be provided, and the cross-section in the [Y, Z] plane is used to determine the potential discomfort window, i.e., the estimated position of the wake vortex 303 taking into account the computation uncertainties.

In a particular embodiment, the module VPosCmp 516 is made up of two sub-modules, for computational capacity issues: a first sub-module with a rough estimator of the position of the wake vortex 303 (with a first accuracy level) and a second sub-module with a refinement estimator (with a second accuracy level that is better than the first accuracy level). The first sub-module can then carry out a geometric computation that is relatively rough and does not take into account all the wind and wake vortex dynamics. The second sub-module then uses a more refined model, which is initialized on the results of the first sub-module, and which corrects the computation uncertainties of the first sub-module by means of a more accurate estimator (recursive Bayesian filter, etc.).

The system 120 further comprises a trajectory management module, VAppCmp 517, for placing the follower aircraft 302 at a suitable distance D from the potential discomfort window or from the estimated position of the wake vortex 303, as appropriate. The module VAppCmp 517 manages the trajectory of the follower aircraft 302 so that the follower aircraft 302 remains outside the potential discomfort window. More specifically, the module VAppCmp 517 controls the placement of the follower aircraft 302 at a predefined distance from the estimated position of the wake vortex 303 (i.e., at the distance Dconf) when allowed by the dimensions of the potential discomfort window and at a predefined margin from the potential discomfort window otherwise.

The module VAppCmp 517 is configured to determine an approach trajectory to the wake vortex 303 and is also configured to track the wake vortex 303 and to align the trajectory of the follower aircraft 302 accordingly so as to keep the follower aircraft 302 outside the potential discomfort window, while seeking to benefit from the upwards air flow induced by the wake vortex 303. Typically, the module VAppCmp 517 computes successive target positions forming the trajectory to be followed by the follower aircraft 302 with the following constraints:

not to enter the potential discomfort window (the dimensions of which can evolve as a function of new measurements gathered in real-time), while seeking to benefit from the upwards air flow induced by the wake vortex;

gather new measurements in order to allow the distribution of probabilities to be corrected and thus improve the estimation performance capabilities and reduce the size of the potential discomfort window; and define comfortable, or even imperceptible, trajectories for the passengers of the follower aircraft 302.

In a particular embodiment, the module VAppCmp 517 is configured, when it detects that the dimensions of the potential discomfort window allow the follower aircraft to be placed at the distance Dconf from the estimated position of the wake vortex (while thus remaining outside the potential discomfort window), to command the follower aircraft 302 to perform movements with a load factor below a predetermined threshold TH_1f. Thus, the system 120 gains observability of the wake vortex 303 in such a way that is comfortable, even imperceptible, for the passengers of the follower aircraft 302.

The system 120 further comprises an aircraft command control management module, ACtrlMgr 518, that is configured to convert each trajectory determined by the module VAppCmp 517 into maneuvering commands for the follower aircraft 302. The maneuvering commands are then transmitted to a flight control management system, ACtrl 502 (servo controls), of the avionics 150, for example, integrated in an autopilot system.

Figure 6:
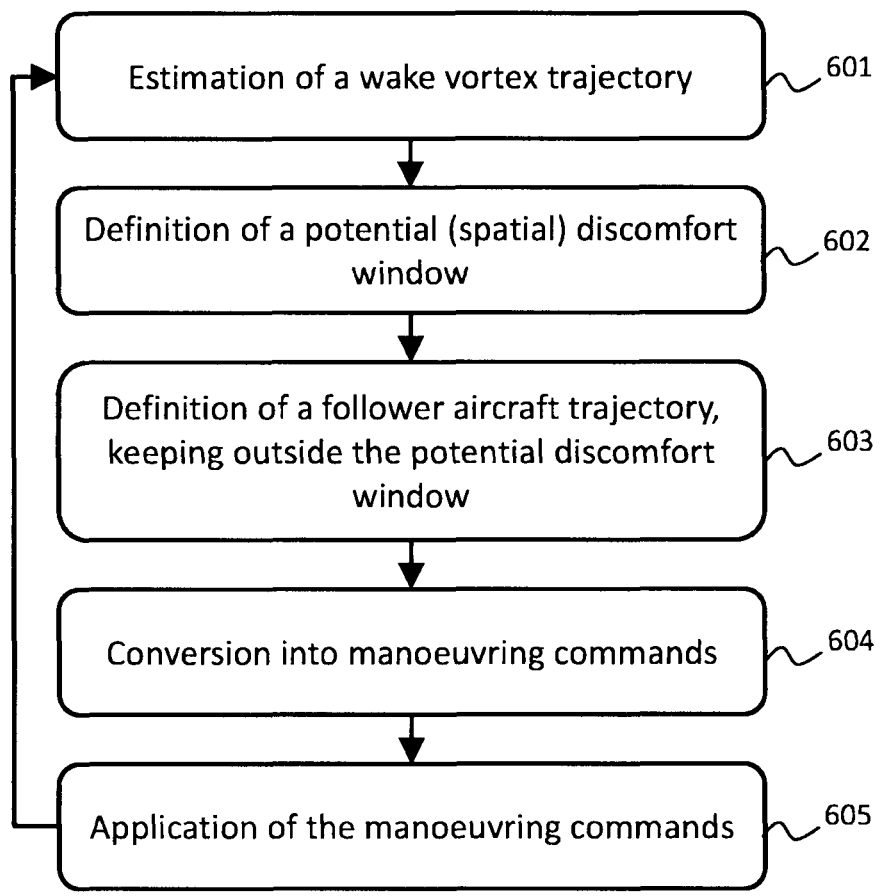
FIG. 6 schematically illustrates a control algorithm for positioning the follower aircraft relative to the leader aircraft during formation flight.

FIG. 6 schematically illustrates an algorithm for controlling the positioning of the follower aircraft 302 relative to the leader aircraft 301 during formation flight.

In a step 601, the system 120 estimates the geometry of the wake vortex 303 for which the follower aircraft 302 seeks to benefit from the upwards air flow phenomenon, as already described with respect to the module VPosCmp 516.

In a step 602, the system 120 determines a potential discomfort window for the passengers of the follower aircraft 302, as already described also with respect to the module VPosCmp 516.

In a step 603, the system 120 defines an approach trajectory to the wake vortex 303, which is converted into aircraft maneuvering commands in a subsequent step 604. This approach trajectory ensures that the potential discomfort window is not entered, while gaining observability in order to reduce the dimensions of the potential discomfort window (optimizing the performance capabilities of the module VPosCmp 516).

Once the approach trajectory has been defined, the system enters a tracking phase, in which the system 120, and more specifically the module VAppCmp 517, defines the successive positions of the trajectory of the follower aircraft 302, while meeting the following conditions: when the dimensions of the potential discomfort window are so large that the follower aircraft 302 cannot be positioned at the distance Dconf, the system 120 defines the trajectory of the follower aircraft 302 in order to remain at a distance that is equal to a predefined margin of the potential discomfort window; and, when the dimensions of the potential discomfort window are small enough for the follower aircraft 302 to be placed at the distance Dconf, the system 120 keeps the follower aircraft 302 at the distance Dconf.

As the flight proceeds, the system 120 continues to acquire measurements taken by the sensors 130. By virtue of these measurements, the system 120 updates the potential discomfort window and thus adjusts the trajectory in accordance with the above conditions.

Real-time gathering of new measurements taken by the sensors 130 when executing the approach trajectory towards the wake vortex 303, and in the tracking phase, allows real-time updating of the position and dimensions of the potential discomfort window. The module VAppCmp 517 exploits the potential discomfort window in order to allow data to be collected as close to the wake vortex 303 as possible, where they are most relevant for reducing estimation uncertainty, without causing discomfort to the passengers of the follower aircraft 302.

In a particular embodiment, the system 120 controls the follower aircraft 302 in order to perform low load factor movements, i.e., with a load factor below the predetermined threshold TH_1f, which is a threshold above which the aircraft movements are considered to be uncomfortable, or perceptible, for the passengers. The relevant movements are in the [Y, Z] plane (vertical and/or lateral movements). The relevant movements are preferably vertical oscillatory or pseudo-oscillatory movements. These movements allow the follower aircraft 302 to be relatively moved relative to the wake vortex 303 and allows new measurements to be acquired from the sensors 130 (gain in "observability"), in order to refine the definition of the potential discomfort window.

In step 604, the system 120 converts the trajectory defined in step 603 into aircraft maneuvering commands so as to cause the follower aircraft 302 to follow the defined trajectory.

In a step 605, the system 120 causes the follower aircraft 302 to apply the maneuvering commands obtained in step 604. The algorithm then loops back to step 601, so as to take into account any changes in the position and geometry of the wake vortex 303, any changes in atmospheric conditions, and to change the potential discomfort window accordingly.

Figure 7:
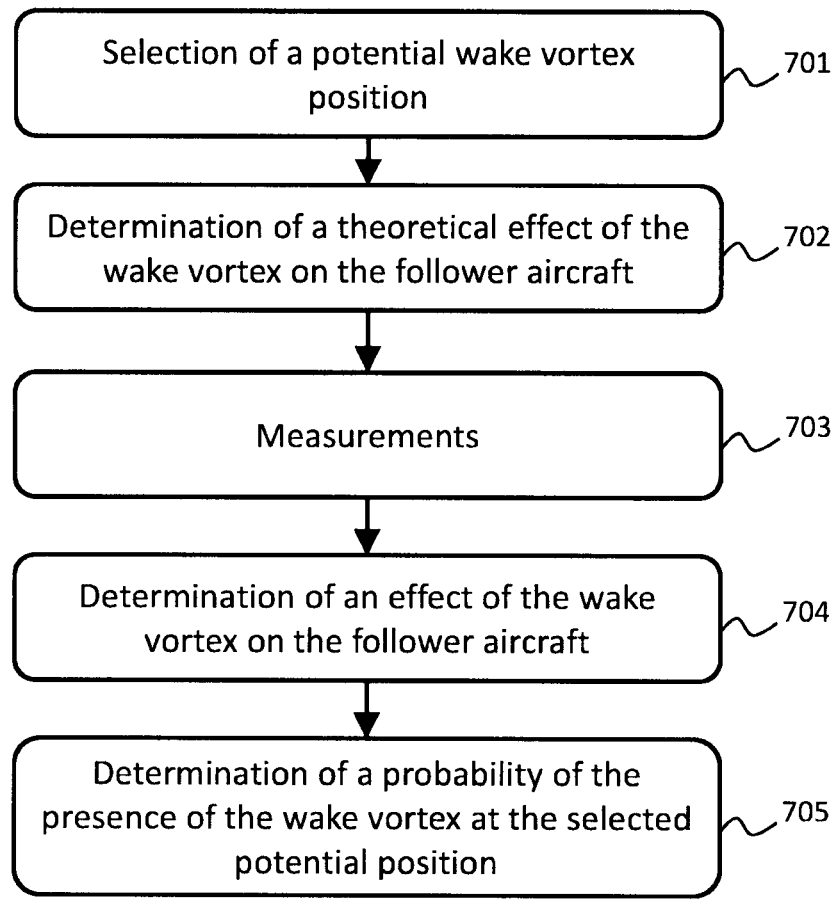
FIG. 7 schematically illustrates an algorithm for determining a probability of the presence of a wake vortex at a given position, in a particular embodiment.

FIG. 7 schematically illustrates an algorithm for determining a probability of the presence of a wake vortex at a given position, thus allowing the potential discomfort window to be determined for the follower aircraft 302, in a particular embodiment adapted to the use of a particle filter. To this end, the algorithm computes a distribution of probabilities of the spatial location of the wake vortex 303. In order to compute this distribution of probabilities, the algorithm computes likelihoods, for example.

In a step 701, the system 120 selects a potential position of the wake vortex 303 from among a set of potential positions. The set of potential positions is defined by an uncertainty analysis, in light of the estimation accuracy (for example, particle filter accuracy), or empirically during flight test phases by comparing modelled data and measurement data.

In a particular embodiment, the system 120 incorporates a particle filter and each particle represents a potential position of the wake vortex 303 (or its center) in the [Y, Z] coordinate system.

In a step 702, the system 120 determines a theoretical effect of the wake vortex 303 on the follower aircraft 302, assuming that the wake vortex 303 is located at the position selected in step 701. To this end, the system 120 uses the aforementioned wake vortex model (provided by the module VModMgr 515).

In a step 703, the system 120 gathers measurements taken by the sensors 130, and, in a step 704, it determines an actual effect on the aircraft 302 of the wake vortex 303 by way of the measurements of the sensors 130 (determined by the module AModMgr 513). In the measurements of the sensors 130, the effect of the wake vortex 303 is predominant compared to other disturbances that would be detected by the sensors 130. Therefore, the effect of these other disturbances on these measurements is negligible.

In a step 705, the system 120 compares the theoretical effect of the wake vortex 303 on the follower aircraft 302 as determined in step 702 with the effect of the wake vortex 303 on the follower aircraft 302 as determined in step 704. The difference between the theoretical effect of the wake vortex 303 on the follower aircraft 302 as determined in step 702, and the effect of the wake vortex 303 experienced by the follower aircraft 302 as determined in step 704, provides a probability value for the presence of the wake vortex 303 at the position selected in step 701.

The system 120 proceeds as such for each potential position of the set of potential positions. A probability value (of the presence of the wake vortex) is thus associated with each potential position of the set of potential positions. As already stated, the probability value can be computed for different values of wake vortex parameters (diameter, etc.). The system 120 then divides the potential positions into two categories: those for which the associated probability is greater than or equal to the predetermined threshold TH_vx, and those for which the associated probability is less than the predetermined threshold TH_vx. A grouping of potential positions with an associated probability that is greater than or equal to the predetermined threshold TH_vx forms the aforementioned potential discomfort window. The situation is schematically illustrated in FIG. 8, where potential wake vortex positions 800a have an associated probability that is greater than or equal to the predetermined threshold TH_vx, and are therefore included in the potential discomfort window 801, and where potential wake vortex positions 800b have an associated probability that is less than the predetermined threshold TH_vx, and are therefore excluded from the potential discomfort window 801.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting a formation flight of aircraft, the method being implemented by a system formed by on-board electronic circuitry in an aircraft acting as a follower aircraft, the system performing the steps of:
    obtaining information relating to a leader aircraft generating a wake vortex inducing an upwards air flow, the system of which aims to benefit the follower aircraft;
    determining a wake vortex effect experienced by the follower aircraft as a difference between measurements, taken by sensors of the follower aircraft, and modelling of the follower aircraft in a wake vortex free environment;
    determining, using a recursive Bayesian filter, an estimated position of the wake vortex based on the information obtained relative to the leader aircraft and a wake vortex model, and determining an estimation uncertainty on the estimated position of the wake vortex by comparing an effect of the wake vortex experienced by the follower aircraft and a theoretical effect of the wake vortex on the follower aircraft according to the wake vortex model;
    determining a potential discomfort window around the estimated position of the wake vortex, as a function of the estimation uncertainty of the estimated position of the wake vortex; and
    defining and applying an approach trajectory to the wake vortex and keeping the follower aircraft outside the potential discomfort window, by controlling a placement of the follower aircraft at a predefined distance from the estimated position of the wake vortex when dimensions of the potential discomfort window are such that this is allowed, and at a predefined margin from the potential discomfort window otherwise.

2. The method according to claim 1, wherein the recursive Bayesian type filter is a particle filter.

3. The method according to claim 2, wherein the estimated position of the wake vortex and the potential discomfort window are determined as follows:
    determining, for each potential position from among a set of potential positions determined based on the determined geometric position of the wake vortex, a probability value for a presence of the wake vortex at said potential position, with the probability value in question being determined by comparing the effect of the wake vortex experienced by the follower aircraft and a theoretical effect of the wake vortex on the follower aircraft according to the wake vortex model when the wake vortex is located at said potential position; and
    forming the potential discomfort window by grouping together potential positions of the wake vortex with a probability value above a first predetermined threshold.

4. The method according to claim 1, wherein, when the system detects that dimensions of the potential discomfort window allow the follower aircraft to be placed at said predefined distance from the estimated position of the wake vortex, the system commands the follower aircraft to perform load factor movements below a second predetermined threshold.

5. The method according to claim 4, wherein the movements in question are vertical.

6. A non-transitory information storage medium storing instructions causing the method according to claim 1 to be implemented, when the instructions are read from the non-transitory information storage medium and executed by a processor.

7. A system for assisting a formation flight of aircraft, formed by on-board electronic circuitry in an aircraft configured to act as a follower aircraft in the formation flight, the electronic circuitry being configured to implement:
    obtaining information relating to a leader aircraft generating a wake vortex inducing an upwards air flow, the system of which aims to benefit the follower aircraft;
    determining a wake vortex effect experienced by the follower aircraft as a difference between measurements, taken by sensors of the follower aircraft, and modelling of the follower aircraft in a wake vortex free environment;
    determining, using a recursive Bayesian filter, an estimated position of the wake vortex based on the information obtained relative to the leader aircraft and a wake vortex model, and determining an estimation uncertainty on the estimated position of the wake vortex by comparing the effect of the wake vortex experienced by the follower aircraft and a theoretical effect of the wake vortex on the follower aircraft according to the wake vortex model;
    determining a potential discomfort window around the estimated position of the wake vortex, as a function of the estimation uncertainty of the estimated position of the wake vortex; and
    defining and applying an approach trajectory to the wake vortex and keeping the follower aircraft outside the potential discomfort window, by controlling a placement of the follower aircraft at a predefined distance from the estimated position of the wake vortex when a size of the potential discomfort window is such that this is allowed, and at a predefined margin from the potential discomfort window otherwise.

8. An aircraft acting as a follower aircraft in a formation flight, which aircraft comprises a formation flight assistance system according to claim 7.

* * * * *